US012669671B2

(12) United States Patent
    Kondo

(10) Patent No.: US 12,669,671 B2
(45) Date of Patent: Jun. 30, 2026

(54) LENS BARREL AND IMAGING DEVICE

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 329 days.

(21) Appl. No.: 18/454,819

(22) Filed: Aug. 24, 2023

(65) Prior Publication Data

US 2023/0393365 A1      Dec. 7, 2023

Related U.S. Application Data

(63) Continuation of application No. PCT/JP2022/007579, filed on Feb. 24, 2022.

(30) Foreign Application Priority Data

Feb. 26, 2021    (JP) ................................. 2021-030645

(51) Int. Cl.
    *G02B 7/02*       (2021.01)
    *G02B 7/14*       (2021.01)
    *H04N 23/667*     (2023.01)

(52) U.S. Cl.
    CPC ............... *G02B 7/021* (2013.01); *G02B 7/14* (2013.01); *H04N 23/667* (2023.01)

(58) Field of Classification Search
    CPC ......... G02B 7/021; G02B 7/14; H04N 23/667
    USPC ....................................................... 359/819
    See application file for complete search history.

(56) References Cited

U.S. PATENT DOCUMENTS

| | | | |
|---|---|---|---|
| 9,948,840 B2 | 4/2018 | Shiraishi |
| 2018/0074284 A1 | 3/2018 | Ono |
| 2019/0187406 A1 | 6/2019 | Hattori et al. |

FOREIGN PATENT DOCUMENTS

| | | | |
|---|---|---|---|
| JP | H0590421 | 12/1993 | |
| JP | H0943705 | 2/1997 | |
| JP | 2000165715 | 6/2000 | |
| JP | 2000284162 | 10/2000 | |
| JP | 2007065385 | 3/2007 | |
| JP | 2008301230 | 12/2008 | |
| JP | 2011107394 | 6/2011 | |
| JP | 2017107013 | 6/2017 | |
| JP | 2017181718 | 10/2017 | |
| JP | 2018045029 | 3/2018 | |
| JP | 2018072613 | 5/2018 | |
| JP | 2018205657 | 12/2018 | |
| JP | 2018205657 A | * | 12/2018 |

(Continued)

OTHER PUBLICATIONS

"Decision of Refusal of Japan Counterpart Application", issued on Jun. 17, 2025, with English translation thereof, p. 1-p. 2.

(Continued)

*Primary Examiner* — William Choi
(74) *Attorney, Agent, or Firm* — JCIPRNET

(57) ABSTRACT

A lens barrel includes a lens barrel main body that holds an imaging optical system, a first operation member that is provided around the lens barrel main body and adjusts an optical function of the imaging optical system, and a second operation member that is provided around the lens barrel main body and varies a degree of adjustment of the optical function by the first operation member. The second operation member is provided near the first operation member.

21 Claims, 15 Drawing Sheets

(56)           References Cited

FOREIGN PATENT DOCUMENTS

| | | |
|---|---|---|
| JP | 2020034606 | 3/2020 |
| WO | 2018047460 | 3/2018 |

OTHER PUBLICATIONS

"Decision of Dismissal of Amendment of Japan Counterpart Application", issued on Jun. 17, 2025, with English translation thereof, p. 1-p. 15.
"Notice of Reasons for Refusal of Japan Counterpart Application", issued on Nov. 26, 2024, with English translation thereof, p. 1-p. 8.
"International Search Report (Form PCT/ISA/210) of PCT/JP2022/007579", mailed on May 17, 2022, with English translation thereof, pp. 1-5.
"International Preliminary Report On Patentability (Form PCT/IPEA/409) of PCT/JP2022/007579", completed on Apr. 20, 2023, with English translation thereof, pp. 1-6.

* cited by examiner

ANGLE-OF-VIEW ZOOMING SPEED S

T0                                    PRESSING TIME TP

ANGLE-OF-VIEW ZOOMING SPEED S

PRESSING TIME TP

<PROGRAM MODE>

FIG. 12

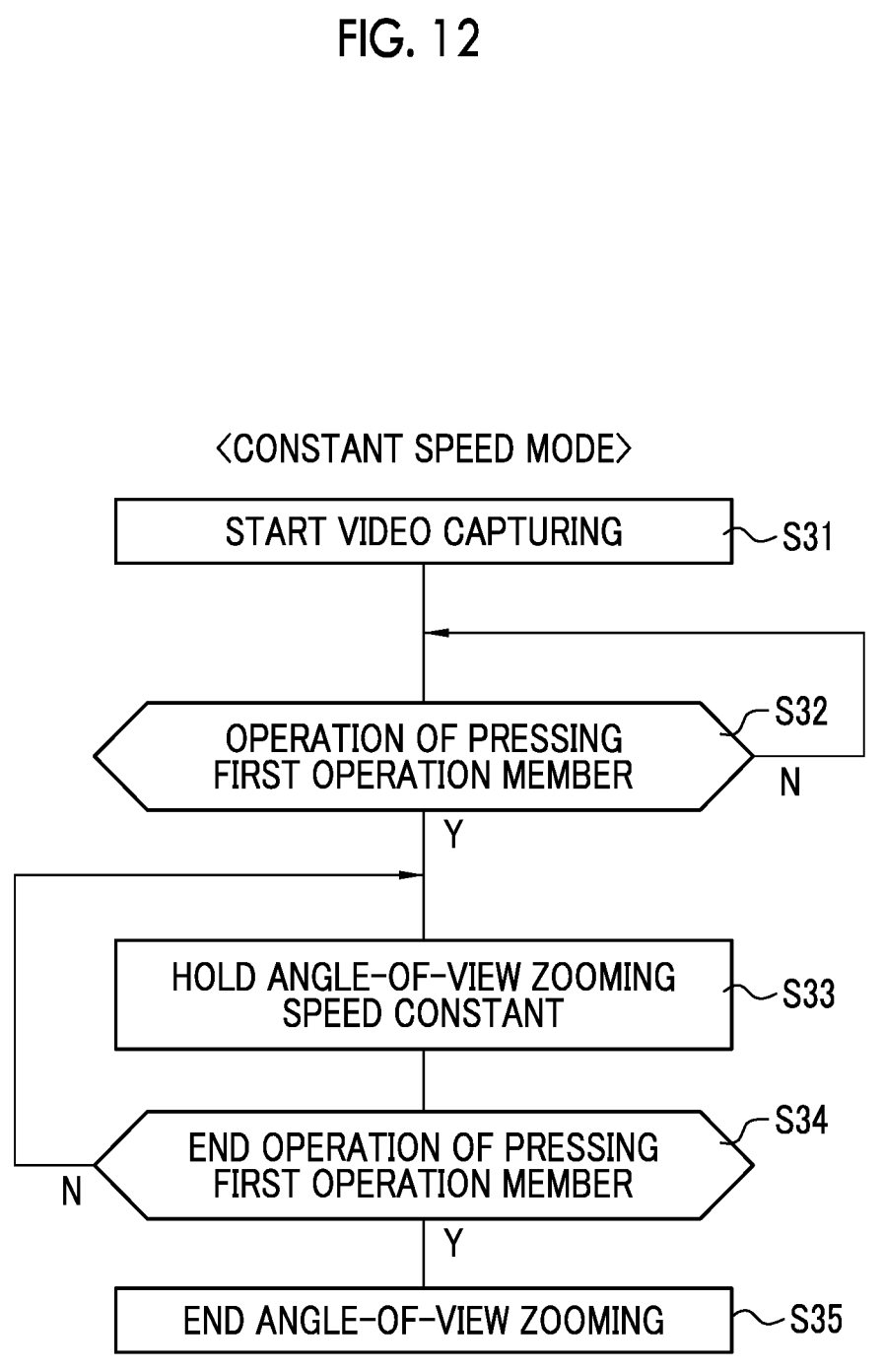

<CONSTANT SPEED MODE>

START VIDEO CAPTURING — S31

OPERATION OF PRESSING
FIRST OPERATION MEMBER — S32

N

Y

HOLD ANGLE-OF-VIEW ZOOMING
SPEED CONSTANT — S33

END OPERATION OF PRESSING
FIRST OPERATION MEMBER — S34

N

Y

END ANGLE-OF-VIEW ZOOMING — S35

FIG. 14

LENS BARREL AND IMAGING DEVICE

CROSS-REFERENCE TO RELATED APPLICATIONS

This application is a Continuation of PCT International Application No. PCT/JP2022/007579 filed on 24 Feb. 2022, which claims priority under 35 U.S.C § 119(a) to Japanese Patent Application No. 2021-030645 filed on 26 Feb. 2021. The above application is hereby expressly incorporated by reference, in its entirety, into the present application.

BACKGROUND OF THE INVENTION

1. Field of the Invention

The present invention relates to a lens barrel and an imaging device.

2. Description of the Related Art

WO2018/047460A (corresponding to US2019/187406A1) describes an optical element drive device comprising an interlinking body that is operated by rotation force of an operation ring, which is rotationally operated, and transmits the rotation force of the operation ring to an optical element to cause the optical element to operate. An operation direction of the optical element with respect to a rotation direction of the operation ring is switched by a switching mechanism that switches the operation direction of the optical element with respect to the rotation direction of the operation ring, which is provided to at least the interlinking body, and the optical element is operated by the rotation force of the operation ring transmitted by the interlinking body. Therefore, operation delay of the optical element is unlikely to occur due to the operation of the optical element, which follows the operation to the operation ring, and high operability of the operation ring is ensured without causing a decrease in functionality.

In JP2011-107394A, in a case where a circuit board of an operating part such as an iris mode selector switch is screwed to a peripheral wall of a housing frame having an opening portion of a drive unit disposed in a lens barrel, a screw hole is formed in a direction of the opening portion and a collar is sandwiched between a screw head and the circuit board. With this configuration, the screwing work is performed easily and quickly without hindrance to insertion of a driver by the peripheral wall at a position facing a disposition position of the circuit board.

SUMMARY OF THE INVENTION

One embodiment according to the technique of the present disclosure provides a lens barrel and an imaging device that allow a user to easily change an adjustment speed of an optical function to a random adjustment speed in a case of video capturing.

In order to achieve the above object, a lens barrel according to an aspect of the present invention comprises a lens barrel main body, a first operation member, and a second operation member. The lens barrel main body holds an optical system. The first operation member is provided around the lens barrel main body and adjusts an optical function of the optical system. The second operation member is provided around the lens barrel main body and varies a degree of adjustment of the optical function by the first operation member.

It is preferable that the second operation member is provided near the first operation member. It is further preferable that the second operation member is disposed with respect to the first operation member in an optical axis direction of the lens barrel main body.

It is preferable that the second operation member is a first rotation member rotatably supported about a rotational axis intersecting an optical axis direction of the lens barrel main body.

It is preferable that a restriction mechanism that is provided in the second operation member and puts rotation of the second operation member in a restriction state where the rotation is restricted is further provided and the restriction mechanism switches between the restriction state and a release state where the restriction state is released.

It is preferable that the lens barrel main body is detachable from and attachable to a camera main body and the second operation member is positioned on a camera main body side of the lens barrel main body in the optical axis direction with respect to the first operation member and is disposed at a position overlapping with the first operation member in a circumferential direction of the lens barrel main body.

It is preferable that the lens barrel has an operation member area including the first and second operation members and in a case where an upper position around the lens barrel in a vertical direction is a reference position, the camera main body side of the lens barrel main body in the optical axis direction is a rear surface side, and a subject side opposite to the camera main body side is a front surface side, the operation member area is provided on a left-side surface side around the lens barrel with the reference position as a base point. It is further preferable that the operation member area is disposed within a range of 0° to 90° with the reference position as the base point. It is preferable that a position of the second operation member in a radial direction of the lens barrel is positioned on an inner diameter side of a maximum outer diameter of the lens barrel.

It is preferable that a processor is further provided and the processor stores in advance a setting pattern indicating a relationship between an operation amount of the first operation member and an adjustment amount of the optical function according to the operation amount and performs, in a case where the first operation member is operated, control of executing a first mode in which the optical function is adjusted according to the setting pattern.

It is preferable that the processor performs control of executing a second mode in which an adjustment speed in the case of adjusting the optical function is accelerated or decelerated according to the operation amount. It is preferable that the processor executes a third mode in which the adjustment speed in the case of adjusting the optical function is held constant regardless of the operation amount.

It is preferable that a third operation member that is provided around the lens barrel main body is further provided and the processor performs control of switching a mode to any one of the first mode, the second mode, or the third mode by operating the third operation member.

It is preferable that the processor performs, in the first mode, control of not receiving an instruction to adjust the optical function by the second operation member.

It is preferable that the processor performs, in the second mode, control of accelerating or decelerating the adjustment speed by operating the second operation member.

It is preferable that the processor performs, in the third mode, control of selecting any one of a plurality of the adjustment speeds by operating the second operation member.

It is preferable that the optical function to be adjusted according to the operation amount of the first operation member is any one of an angle of view, a stop, or a camera shake correction amount of the optical system.

An imaging device according to an aspect of the present invention comprises the lens barrel described above and a camera main body.

BRIEF DESCRIPTION OF THE DRAWINGS

FIG. 12 is a flowchart describing an operation of the digital camera in the constant speed mode.

FIG. 14 is a side view of the digital camera according to a third embodiment.

DESCRIPTION OF THE PREFERRED EMBODIMENTS

First Embodiment

Figure 1:
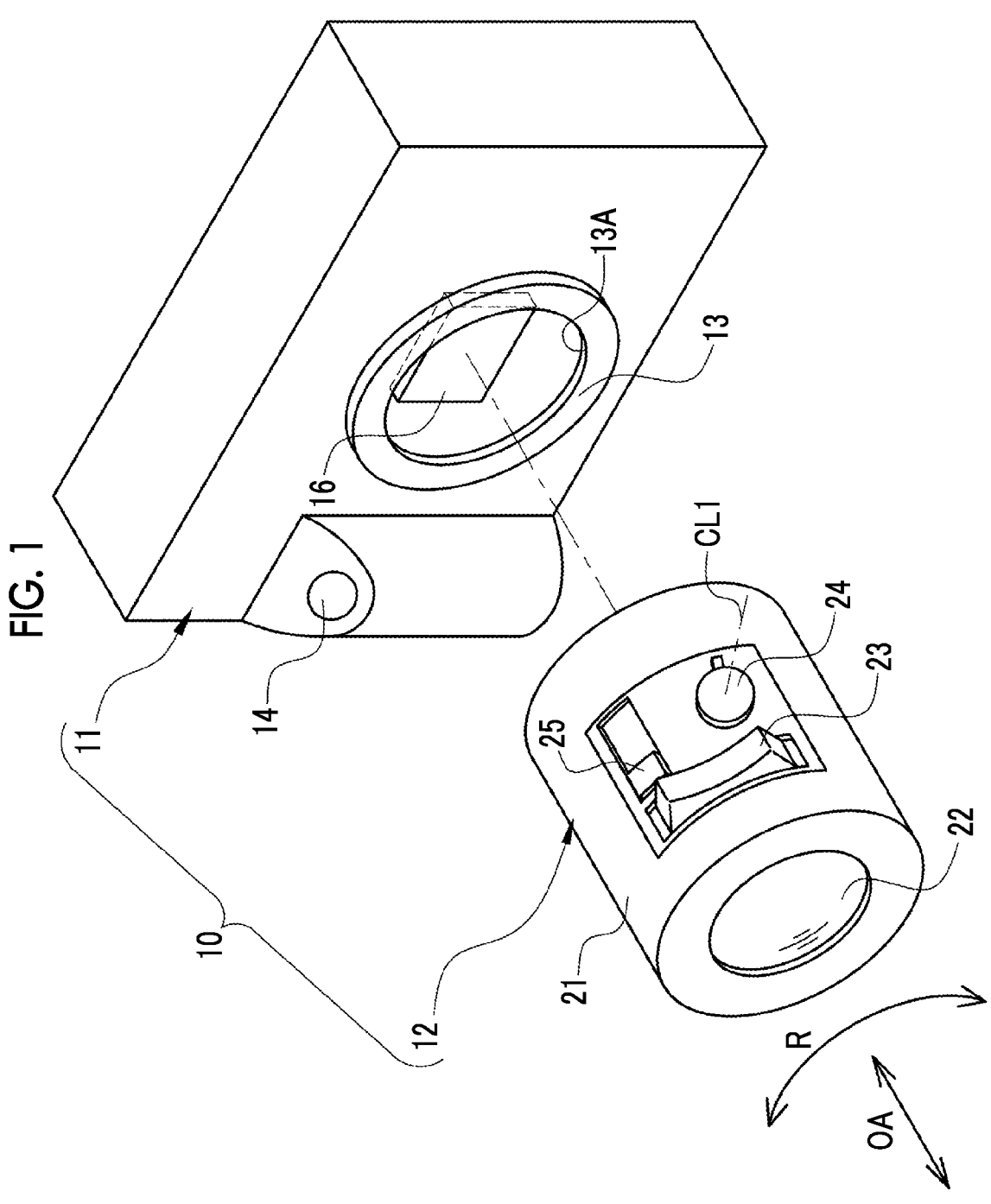
FIG. 1 is an exploded perspective view of a digital camera.

As shown in FIG. 1, a digital camera 10 comprises a camera body 11 and an interchangeable lens barrel 12. The camera body 11 corresponds to a camera main body within the scope of the claims. A lens mount 13, a release switch 14, a power switch (not shown), and the like are provided on a front surface of the camera body 11. The lens mount 13 has a circular imaging aperture 13A. The lens barrel 12 is mounted to the lens mount 13 attachably and detachably. The digital camera 10 is an example of an imaging device according to the present invention.

An imaging element 16 is built into the camera body 11. The imaging element 16 is, for example, a complementary metal oxide semiconductor (CMOS) image sensor, a charge coupled device (CCD) image sensor, or an organic thin-film imaging element. The lens mount 13 is provided with a body-side signal contact 17 (refer to FIG. 4) for electrically connecting to and communicating with the lens barrel 12 inside the imaging aperture 13A.

The lens barrel 12 comprises a lens barrel main body 21, an imaging optical system 22, a first operation member 23, a second operation member 24, and a third operation member 25. The lens barrel main body 21 has a cylindrical shape and holds an imaging optical system 22 inside, and is provided with a lens mount 26 and a lens-side signal contact 27 (refer to FIG. 4) at a rear end. In a case where the lens barrel 12 is mounted to the camera body 11, the imaging optical system 22 forms subject light on the imaging element 16.

Figure 2:
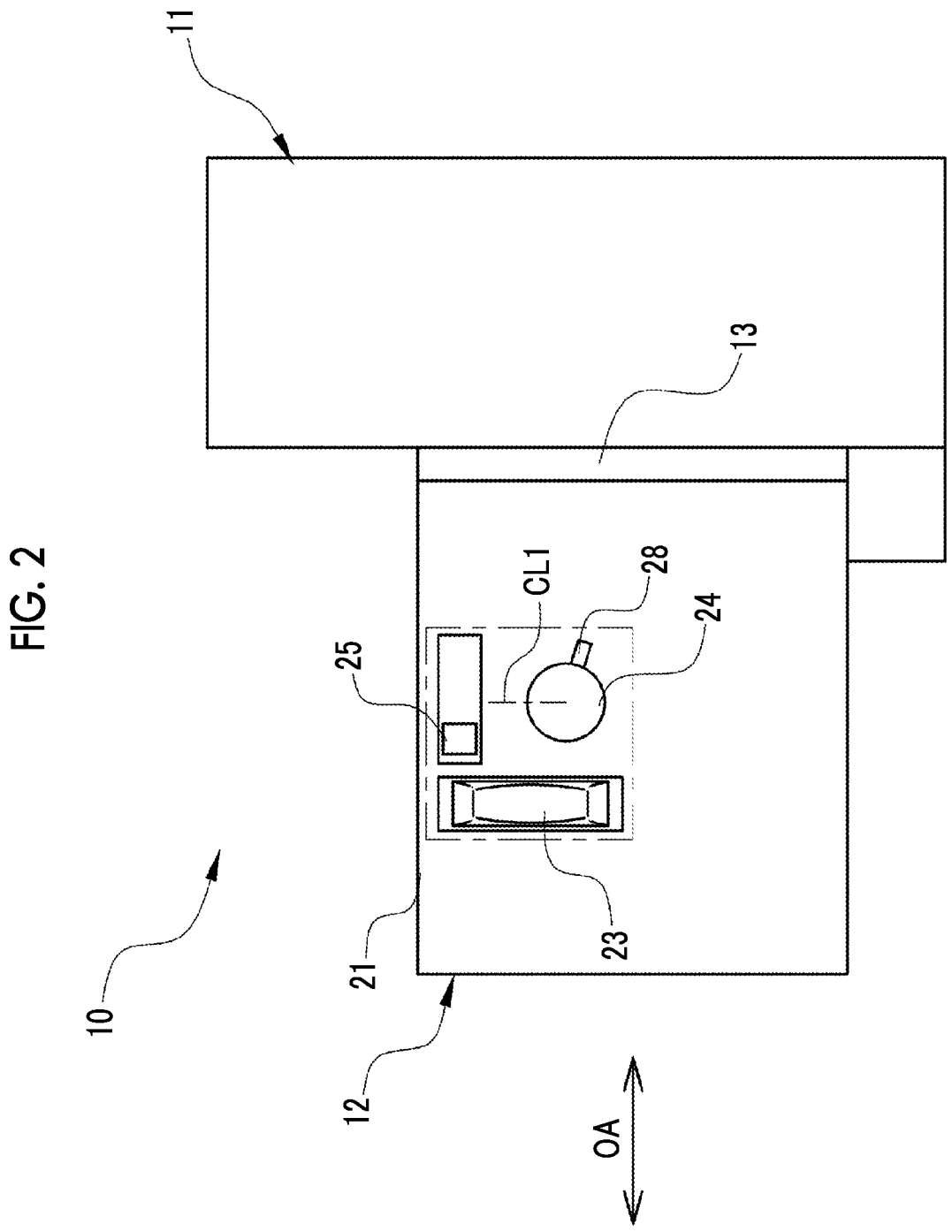
FIG. 2 is a side view of the digital camera.

As shown in FIG. 2, the first operation member 23 is provided around the lens barrel main body 21, and specifically, is provided on an outer peripheral surface of the lens barrel main body 21. The first operation member 23 is an operation member disposed along a circumferential direction R (refer to FIG. 1) orthogonal to an optical axis direction OA, and specifically, is a well-known seesaw switch. The first operation member 23 is used in adjusting a speed of angle-of-view zooming, which will be described below, of the imaging optical system 22.

Figure 3:
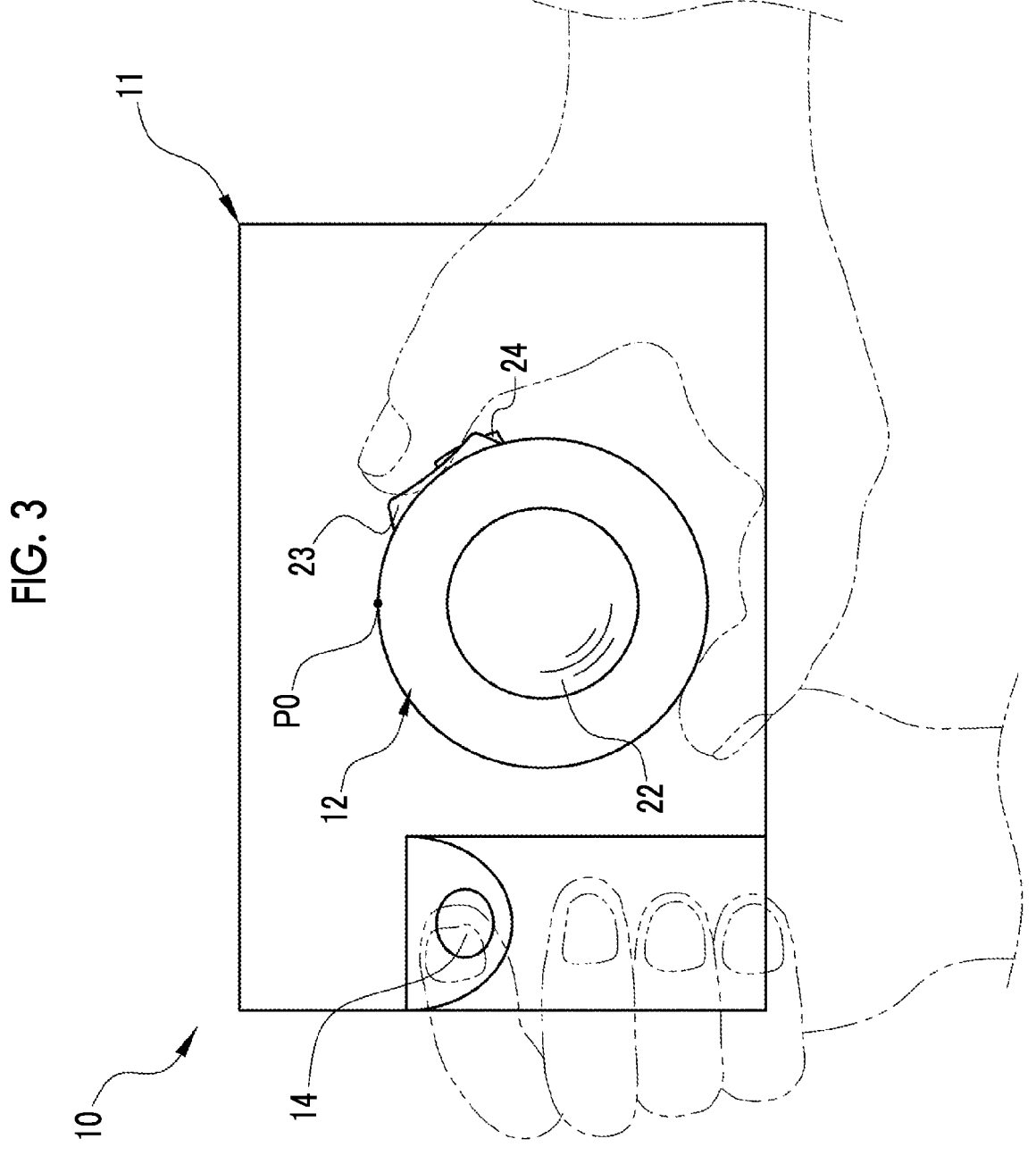
FIG. 3 is a front view of the digital camera.

As shown in FIG. 3, the second operation member 24 is provided around the lens barrel main body 21, and specifically, is provided on the outer peripheral surface of the lens barrel main body 21. Further, the second operation member 24 is disposed with respect to the first operation member 23 in the optical axis direction OA of the lens barrel main body 21.

The second operation member 24 is provided near the first operation member 23. The term "near" as used herein means that both the first operation member 23 and the second operation member 24 are disposed within a range in which the members can be operated by the left hand of a user. Further, in this case, it is assumed that the camera body 11 is gripped by the right hand of the user and the lens barrel 12 is gripped by the left hand of the user. Accordingly, the user can easily perform an operation of adjusting the zoom (angle-of-view zooming) of the imaging optical system 22 to a random adjustment speed using only a finger (for example, thumb) of the left hand.

The second operation member 24 is positioned on a camera body 11 side in the optical axis direction OA with respect to the first operation member 23 and disposed at a position overlapping with the first operation member 23 in the circumferential direction R of the lens barrel main body 21. The second operation member 24 is rotatably supported about a rotational axis CL1 (refer to FIGS. 1 and 2) intersecting the optical axis direction OA of the lens barrel main body 21. The rotational axis CL1 is preferably orthogonal to the optical axis direction OA. The second operation member 24 corresponds to a first rotation member within the scope of the claims. The second operation member 24 varies a degree of adjustment of the zoom (angle-of-view zooming) of the imaging optical system 22 by the first operation member 23. Specific examples of varying the degree of adjustment of optical functions including the zoom will be described below.

Further, the second operation member 24 is provided with a lock knob 28. The lock knob 28 constitutes a restriction mechanism within the scope of the claims. This restriction mechanism has the same configuration as a restriction mechanism that restricts rotation of a mode dial or the like of the camera. For example, the lock knob 28 is provided to be rotatable between a restriction position (position indicated by solid line in FIG. 4) and a release position (position indicated by two-dot chain line in FIG. 4) about the rotational axis CL1 of the second operation member 24. With the rotation of the lock knob 28, switching can be made between a restriction state where the rotation of the second operation member 24 is restricted and a release state where the restriction state is released. That is, in a case where the lock knob 28 is in the restriction position, the restriction mechanism is in the restriction state where the rotation of the second operation member 24 is restricted. In a case where the lock knob 28 is in the release position, the restriction mechanism is in the release state where the restriction state is released and the rotation of the second operation member 24 is allowed.

Figure 4:
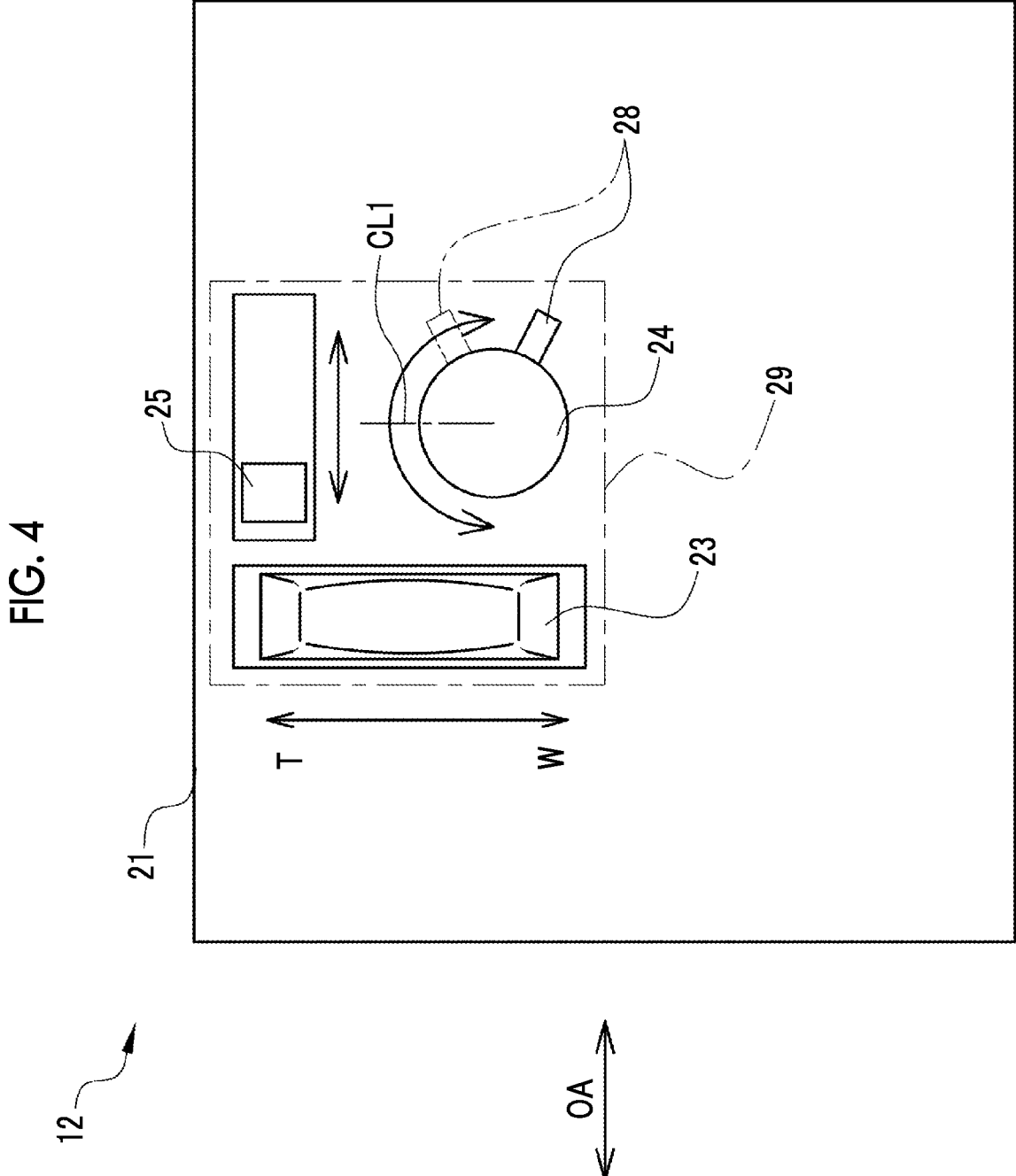
FIG. 4 is a side view of a lens barrel.
Figure 5:
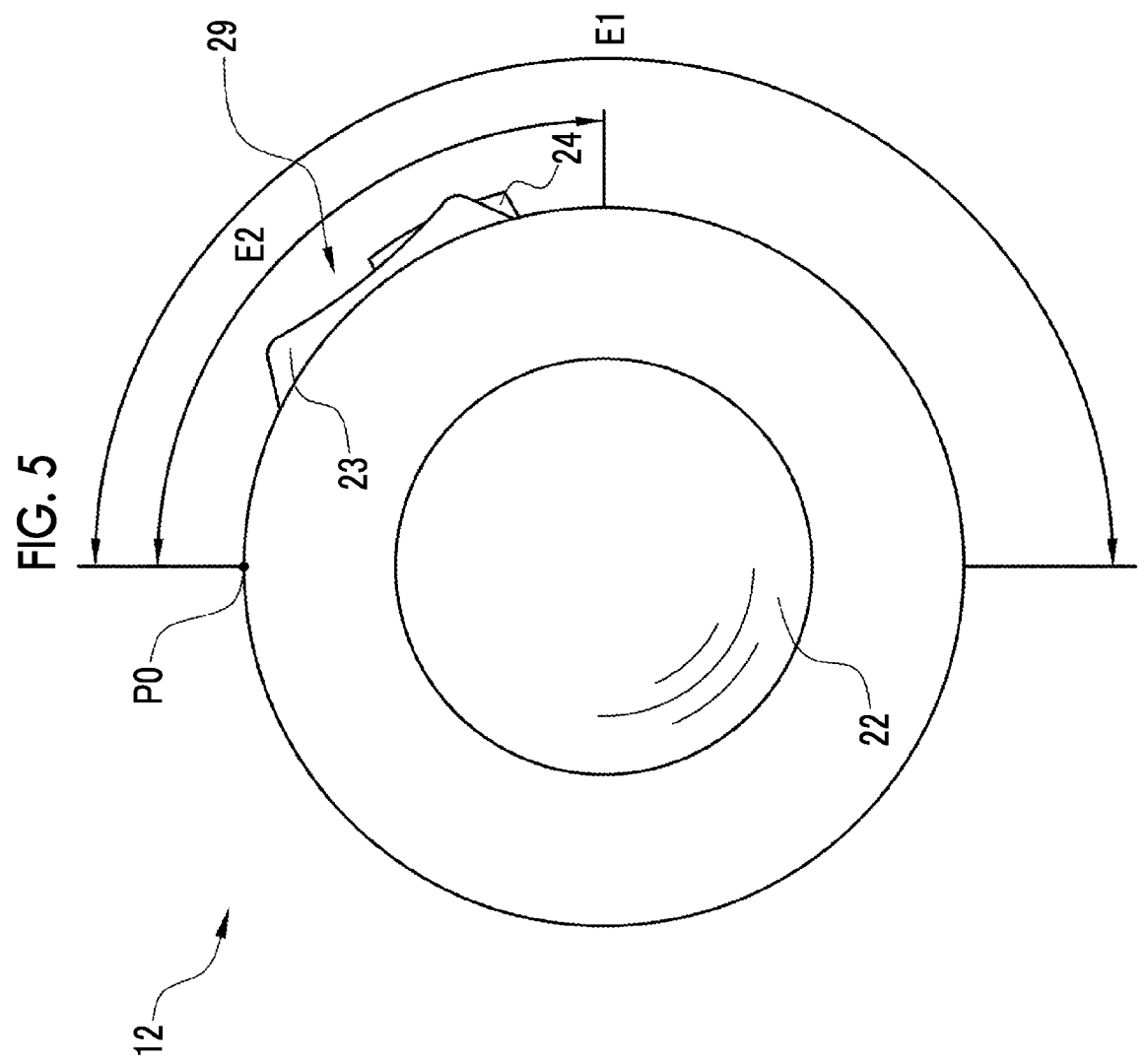
FIG. 5 is an explanatory diagram describing a position of an operation member area.

As shown in FIG. 4, the lens barrel 12 has an operation member area 29 (range surrounded by one-dot chain line) including the first and second operation members 23 and 24. As shown in FIG. 5, in a case where an upper position around the lens barrel main body 21 in a vertical direction is a reference position P0, the camera body 11 side of the lens barrel main body 21 in the optical axis direction OA is a rear surface side, and a subject side opposite to the camera body 11 side is a front surface side, the operation member area 29 is provided within a range E1 (refer to FIG. 3) on a left-side surface side around the lens barrel main body 21 with the reference position P0 as a base point. It is further preferable that the operation member area 29 is disposed within a range E2 (refer to FIG. 3) of 0° to 90° with the reference position P0 as the base point.

The third operation member 25 is provided around the lens barrel main body 21, and specifically, is provided on the outer peripheral surface of the lens barrel main body 21. The third operation member 25 is disposed within the range of the operation member area 29 described above. The third operation member 25 is positioned on the camera body 11 side in the optical axis direction OA with respect to the first operation member 23 and disposed at a position overlapping with the second operation member 24 in the optical axis direction OA.

The third operation member 25 is a slide switch extending along the optical axis direction OA, and is a mode selector switch that switches a mode to any one of a program mode, a variable speed mode, and a constant speed mode.

Figure 6:
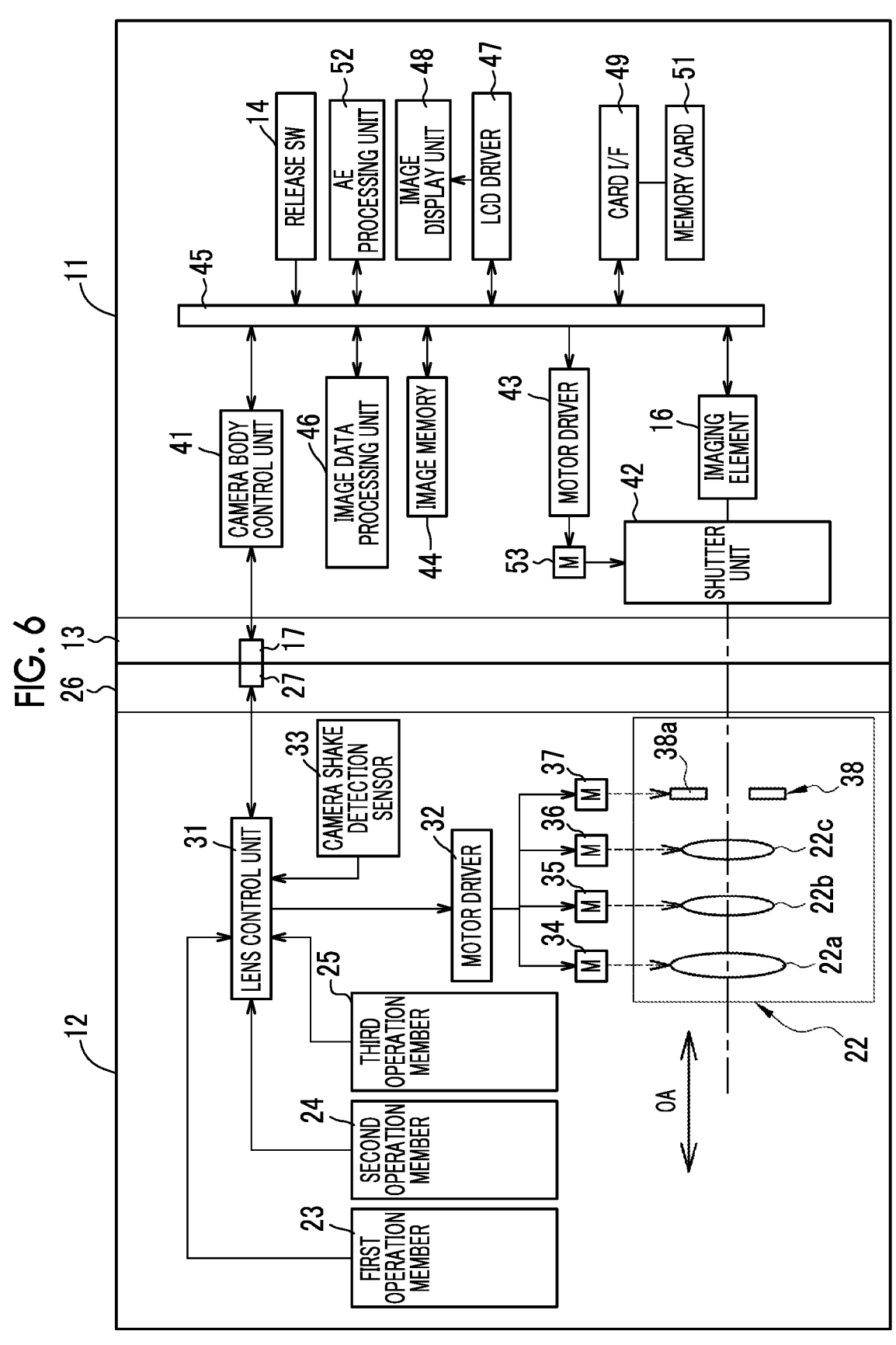
FIG. 6 is a block diagram showing a schematic configuration of the digital camera.

As shown in FIG. 6, the lens barrel 12 comprises a lens control unit 31, a motor driver 32, a camera shake detection sensor 33, motors 34 to 37, and the like, in addition to the imaging optical system 22, the first to third operation members 23 to 25, and the like.

The lens control unit 31 is composed of a microcomputer provided with a central processing unit (CPU), a read only memory (ROM) that stores a program and a parameter used by the CPU, a random access memory (RAM) used as a work memory of the CPU (none of which is shown), and the like, and controls each part of the lens barrel 12. The first to third operation members 23 to 25, the motor driver 32, and the camera shake detection sensor 33 are connected to the lens control unit 31.

The lens control unit 31 controls a stop unit 38, a focus lens 22a, a zoom lens 22b, and a camera shake correction lens 22c based on signals by operations of the first to third operation members 23 to 25, and a control signal from a camera body control unit 41 described below.

The imaging optical system 22 comprises a plurality of lenses including the focus lens 22a and the zoom lens 22b, the stop unit 38, and the like. The focus lens 22a moves in the optical axis direction OA by being driven by the motor 34 to adjust an imaging distance of the imaging optical system 22.

The zoom lens 22b constitutes an electric zoom mechanism that moves in the optical axis direction OA by being driven by the motor 35 to change an angle of view of the imaging optical system 22. In this zoom mechanism, a movement amount and a movement direction of the zoom lens 22b are determined according to a pressing time as an operation amount of the first operation member 23. As described above, in a case where the seesaw switch is used as the first operation member 23 and one end side (reference numeral T side) of the first operation member 23 shown in FIG. 3 is pressed, the zoom lens 22b moves to a telephoto end side. In a case where the other end side (reference numeral W side) of the first operation member 23 is pressed, the zoom lens 22b moves to a wide-angle end side. In this manner, the angle of view of the imaging optical system 22 can be changed.

The stop unit 38 moves a plurality of stop leaf blades 38a by being driven by the motor 36 to change an amount of light incident on the imaging element 16. The camera shake detection sensor 33 detects a camera shake direction and a camera shake amount of the lens barrel 12. The camera shake direction and the camera shake amount detected by the camera shake detection sensor 33 are output to the lens control unit 31 as a camera shake detection signal. The lens control unit 31 controls the drive of the motor 37 based on the camera shake detection signal to correct a camera shake by moving the camera shake correction lens 22c. The motor driver 32 controls the drive of the motors 34 to 37 based on the control of the lens control unit 31.

The camera body control unit 41 comprises a CPU, a ROM that stores a program and a parameter used by the CPU, a RAM used as a work memory of the CPU (none of which is shown), and the like. The camera body control unit 41 controls each part of the camera body 11 and the lens barrel 12 connected to the camera body 11. A release signal is input to the camera body control unit 41 from the release switch 14. Further, the body-side signal contact 17 is connected to the camera body control unit 41.

The lens-side signal contact 27 contacts the body-side signal contact 17 in a case where the lens mount 26 of the lens barrel 12 is mounted to the lens mount 13 of the camera body 11, and electrically connects the lens barrel 12 and the camera body 11.

A shutter unit 42 is a so-called focal plane shutter and is disposed between the lens mount 13 and the imaging element 16. The shutter unit 42 is provided so as to be able to block an optical path between the imaging optical system 22 and the imaging element 16, and changes between an open state and a closed state. The shutter unit 42 is in the open state in a case where a live view image and a video are captured. The shutter unit 42 temporarily changes from the open state to the closed state in a case of still image capturing. The shutter unit 42 is driven by a shutter motor 53. A motor driver 43 controls the drive of the shutter motor 53.

The imaging element 16 is driven and controlled by the camera body control unit 41. The imaging element 16 has a light-receiving surface composed of a plurality of pixels (not shown) arranged in a two-dimensional matrix. Each pixel includes a photoelectric conversion element, and a subject image formed on the light-receiving surface by the lens barrel 12 is photoelectrically converted to generate an imaging signal.

The imaging element 16 comprises a signal processing circuit such as a noise reduction circuit, an auto gain controller, and an A/D conversion circuit (none of which is shown). The noise reduction circuit performs noise reduction processing on the imaging signal. The auto gain controller amplifies a level of the imaging signal to an optimum value. The A/D conversion circuit converts the imaging signal into a digital signal and outputs the converted signal from the imaging element 16 to a bus line 45. The output signal of the imaging element 16 is image data (so-called RAW data) having one color signal for each pixel.

The image memory 44 stores image data for one frame output to the bus line 45. An image data processing unit 46 reads out the image data for one frame from the image memory 44 and performs known image processing such as matrix calculation, demosaicing, γ correction, brightness/ color difference conversion, and resizing processing.

An LCD driver 47 sequentially inputs, to an image display unit 48, the image data for one frame subjected to the image processing by the image data processing unit 46. The image display unit 48 is provided, for example, on a rear surface of the camera body 11 and sequentially displays live view images at constant periods. A card interface (I/F) 49 is incorporated in a card slot (not shown) provided in the camera body 11 and is electrically connected to a memory card 51 inserted in the card slot. The card I/F 49 stores the image data subjected to the image processing by the image data processing unit 46 in the memory card 51. In a case where the image data stored in the memory card 51 is reproduced and displayed, the card I/F 49 reads out the image data from the memory card 51.

The camera body control unit 41 performs control of moving the focus lens 22a on the lens control unit 31 according to information on a rotation direction and a rotation amount of a focus ring (not shown) or information on a subject distance measured by an autofocus function.

The camera body control unit 41 operates the stop unit 38 according to exposure information calculated by an automatic exposure (AE) processing unit 52, which will be described below, to transmit a control signal for changing a stop diameter to the lens control unit 31. The lens control unit 31 controls the motor driver 32 based on the control signal to change the stop diameter. The lens control unit 31 controls the motor driver 32 based on the control signal to control the stop diameter of the stop unit 38 such that an F number calculated by the AE processing unit 52 can be obtained.

The AE processing unit 52 calculates an integrated value of each color signal from the image data for one frame. The camera body control unit 41 calculates an exposure value based on the integrated value calculated for each image for one frame and determines a shutter speed and the F number from the exposure value according to a predetermined program diagram. The camera body control unit 41 controls the drive of the shutter motor 53 such that the determined shutter speed is obtained, and transmits the control signal to the lens control unit 31. The lens control unit 31 controls the motor driver 32 based on the control signal to operate the stop unit 38 to the stop diameter at which the determined F number can be obtained.

In the lens barrel 12, the adjustment speed of the zoom (angle-of-view zooming) of the imaging optical system 22 is mainly adjusted by the first and second operation members 23 and 24. The lens control unit 31 performs control of switching the mode to any one of the plurality of modes for the zoom operation by the operation of the third operation member 25. The plurality of modes for the zoom operation switched by the operation of the third operation member 25 are the program mode, the variable speed mode, and the constant speed mode.

The program mode corresponds to a first mode within the scope of the claims. The lens control unit 31 stores in advance a plurality of setting patterns indicating a relationship between the operation amount of the first operation member 23 and an adjustment amount of the angle-of-view zooming according to the operation amount. In a case where the program mode is selected by the third operation member 25, any one of the plurality of setting patterns can be selected by the second operation member 24 or by an input operation from the camera body 11. In a case where the camera body 11 performs the input operation of the setting pattern, for example, the plurality of setting patterns are displayed on the image display unit 48 and the user can select any one of the setting patterns with reference to the image display unit 48. In a case where the first operation member 23 is operated, the lens control unit 31 performs control of executing the program mode of adjusting the angle-of-view zooming according to the selected setting pattern.

Figure 7A:
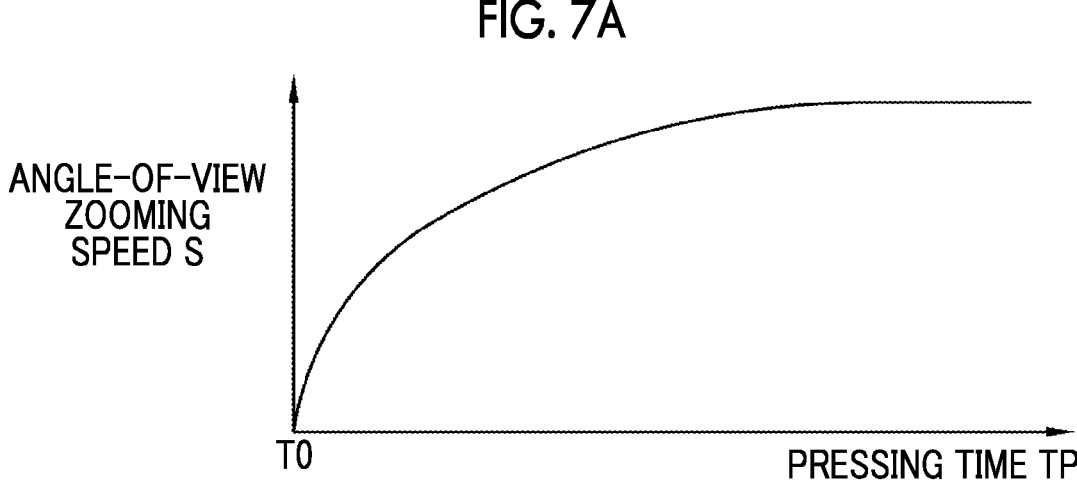
FIGS. 7A and 7B are graphs showing a relationship between an operation amount and an adjustment speed in a program mode.
Figure 7B:
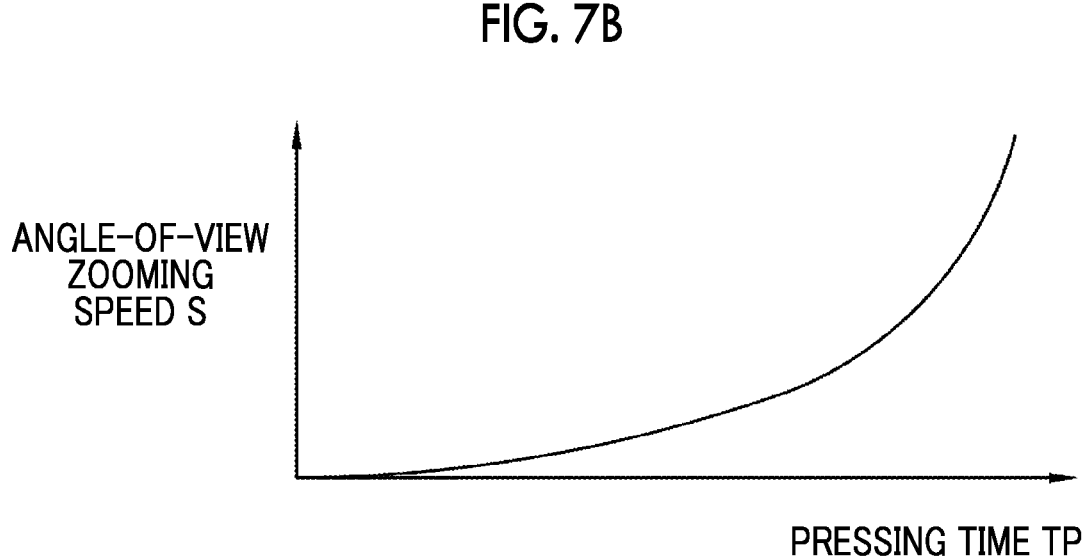

As described above, in the zoom operation in the imaging optical system 22, the zoom lens 22b moves according to the operation amount of the first operation member 23. FIGS. 7A and 7B are examples of setting patterns that are stored in advance by the lens control unit 31 and executed in the program mode, and show relationships between a pressing time TP as the operation amount and an angle-of-view zooming speed S according to the pressing time TP. The angle-of-view zooming speed corresponds to the adjustment speed within the scope of the claims.

In the pattern shown in FIG. 7A, an amount of increase in the angle-of-view zooming speed S is the largest (acceleration is large) at a rising edge (pressing start time TO), the amount of increase in the angle-of-view zooming speed S is gradually small (acceleration is small) as the pressing time TP elapses, and the angle-of-view zooming speed S is constant near the wide-angle end or the telephoto end of the zoom lens 22b. That is, the pattern shown in FIG. 7A is a pattern in which the acceleration of the rising edge is emphasized.

On the other hand, in the pattern shown in FIG. 7B, the amount of increase in the angle-of-view zooming speed S is the smallest (acceleration is small) at the rising edge (pressing start time TO), the amount of increase in the angle-of-view zooming speed S is gradually large (acceleration is large) as the pressing time TP elapses, and the angle-of-view zooming speed S is maximized near the wide-angle end or the telephoto end (falling edge) of the zoom lens 22b. That is, the pattern shown in FIG. 7B is a pattern in which the acceleration of the falling edge is emphasized. The setting patterns that are stored in advance by the lens control unit 31 and executed in the program mode are not limited to the above patterns. Various setting patterns can be provided according to a request of the user, such as a pattern in which the angle-of-view zooming speed or the acceleration is constant or a pattern in which both the acceleration in the rising edge and the acceleration in the falling edge are emphasized.

Further, in the program mode, in a case where the video capturing is performed or the angle-of-view zooming speed is adjusted by the first operation member 23, the lens control unit 31 does not receive an instruction to adjust the angle-of-view zooming speed (instruction to change the setting pattern) by the second operation member 24. That is, in a case where the video capturing is performed or the angle-of-view zooming of the imaging optical system 22 is performed, the lens control unit 31 performs control of invalidating the operation of the second operation member 24.

The variable speed mode corresponds to a second mode within the scope of the claims. In a case where the variable speed mode is selected by the third operation member 25, the lens control unit 31 performs control of accelerating or decelerating the angle-of-view zooming speed of the imaging optical system 22 according to the operation amount of the first operation member 23. The lens control unit 31 stores in advance an increase rate or a decrease rate of the angle-of-view zooming speed S of the imaging optical system 22 according to the pressing time TP as the operation amount of the first operation member 23.

Figure 8A:
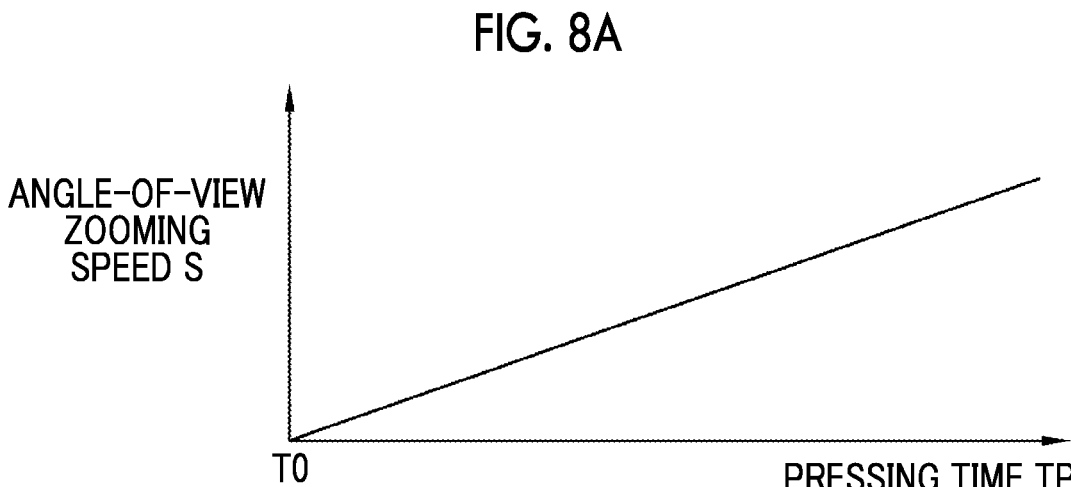
FIGS. 8A and 8B are graphs showing a relationship between the operation amount and the adjustment speed in a variable speed mode.
Figure 8B:
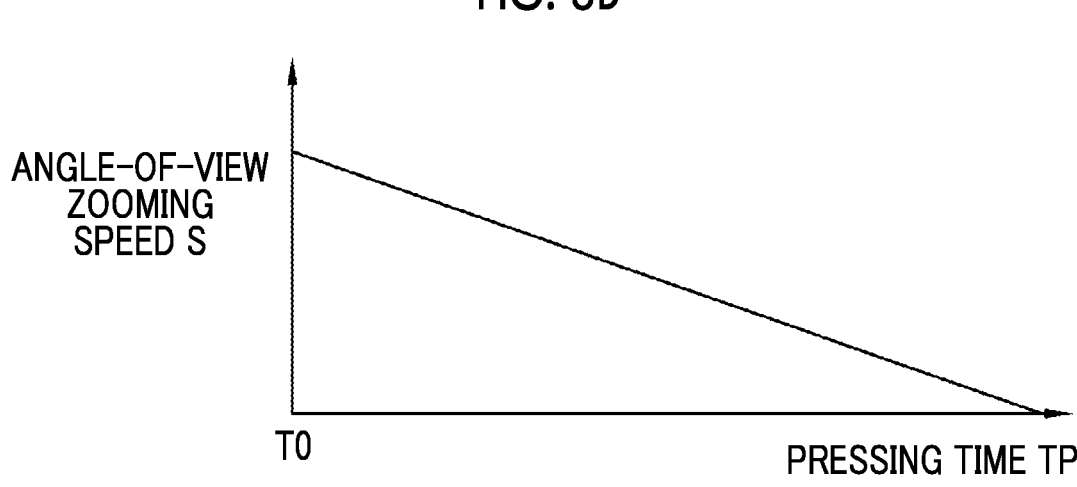

FIG. 8A is an example of a case where the angle-of-view zooming speed S of the imaging optical system 22 accelerates according to the pressing time TP of the first operation member 23. FIG. 8B is an example of a case where the angle-of-view zooming speed S of the imaging optical system 22 decelerates according to the pressing time TP of the first operation member 23. In a case where the variable speed mode is selected by the third operation member 25, the lens control unit 31 can select any one of control of accelerating or control of decelerating the angle-of-view zooming speed S of the imaging optical system 22 according to the pressing time TP, by the second operation member 24 or by the input operation from the camera body 11. The control of accelerating or decelerating the angle-of-view zooming speed S of the imaging optical system 22 according to the pressing time TP is not limited thereto and may include control of selecting one of a plurality of stages with different increase rates or decrease rates of the angle-of-view zooming speed S.

Figure 9:
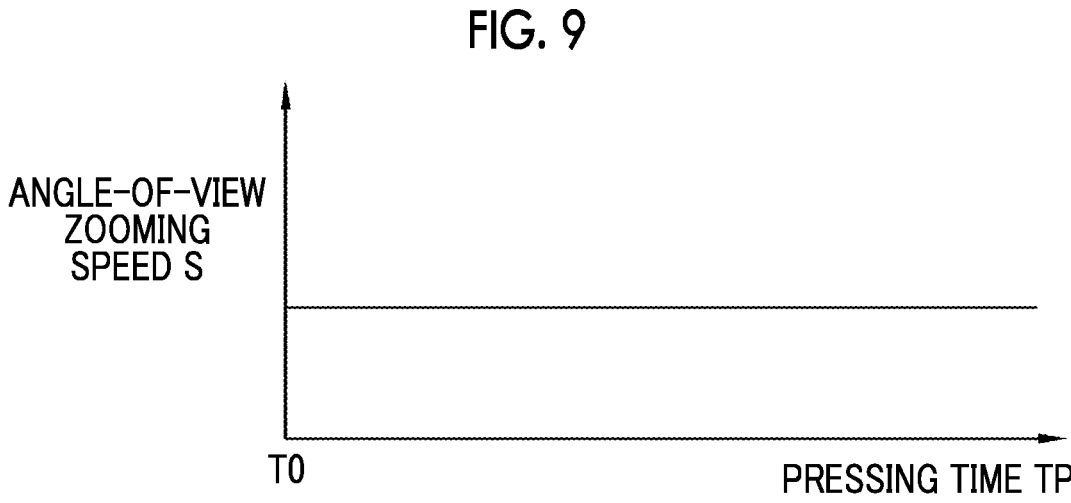
FIG. 9 is a graph showing a relationship between the operation amount and the adjustment speed in a constant speed mode.

The constant speed mode corresponds to a third mode within the scope of the claims. In a case where the constant speed mode is selected by the third operation member 25, the lens control unit 31 performs control of holding the angle-of-view zooming speed in a case of adjusting the angle-of-view zooming of the imaging optical system 22 constant regardless of the operation amount. FIG. 9 shows an example of a case where the angle-of-view zooming speed S is held constant regardless of the pressing time TP as the operation amount of the first operation member 23. The control of holding the angle-of-view zooming speed S constant regardless of the pressing time TP is not limited thereto, and may include control of selecting any one of a plurality of angle-of-view zooming speeds S by the operation of the second operation member 24.

An operation of the digital camera 10 according to the present embodiment will be described with reference to flowcharts of FIGS. 9 to 12. In a case where the user operates the power switch (not shown) to turn on power, a power supply voltage is supplied to each part of the digital camera 10. Prior to performing the video capturing, the user operates the third operation member 25 to select any one of the first to third modes.

Figure 10:
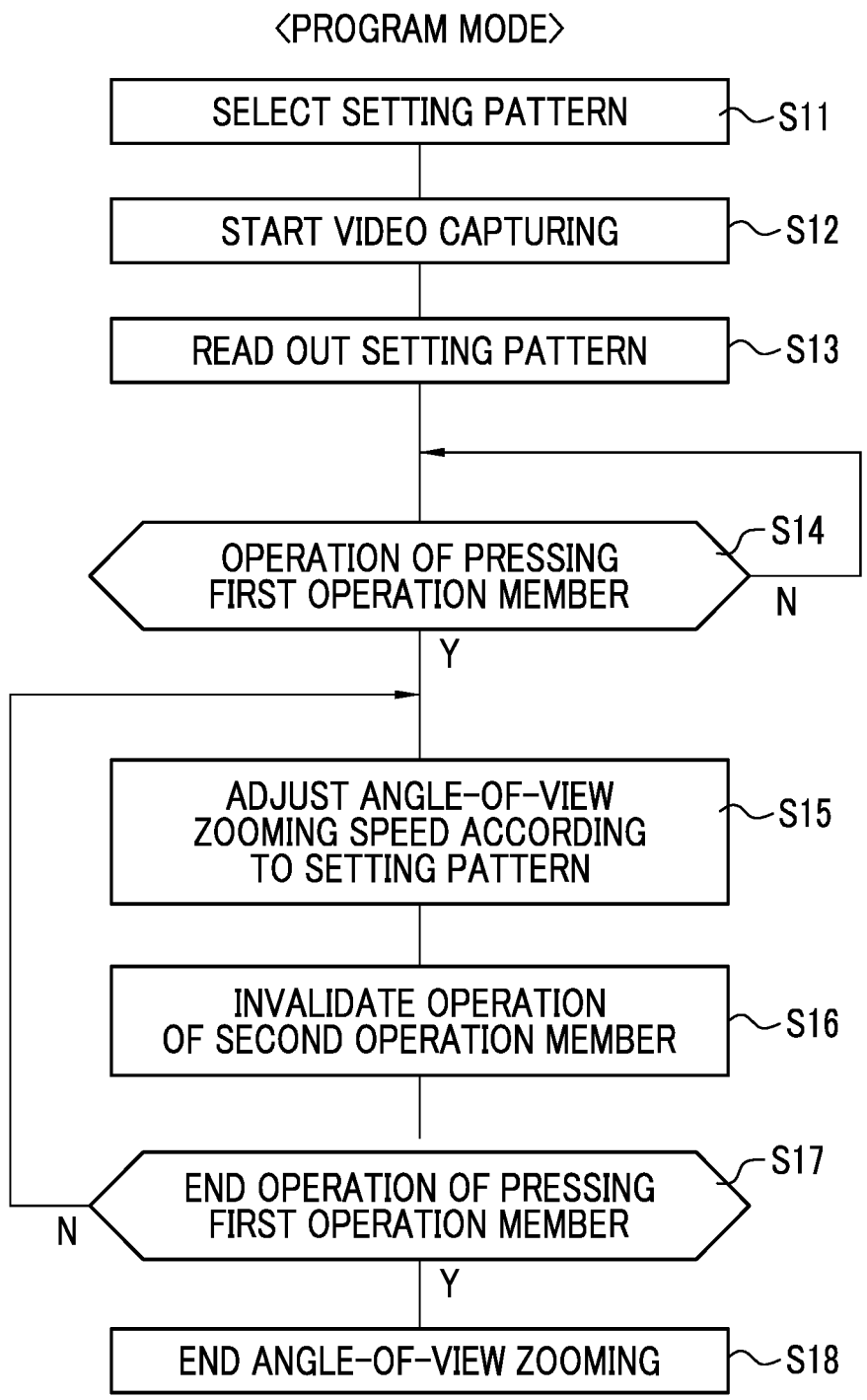
FIG. 10 is a flowchart describing an operation of the digital camera in the program mode.

As shown in FIG. 10, in a case where the program mode is selected, an operation of selecting any one of the setting patterns stored in advance by the user is performed (S11). Then, in a case where an operation of selecting the video capturing as the imaging mode is performed to start the video capturing (S12), the lens control unit 31 reads out the setting pattern selected by the user (S13).

In a case where the first operation member 23 is pressed (Y in S14), the lens control unit 31 performs control of adjusting the angle-of-view zooming speed of the imaging optical system 22 according to the setting pattern selected by the user (S15). In a case where the angle-of-view zooming of the imaging optical system 22 is performed, the lens control unit 31 does not receive the instruction to adjust the angle-of-view zooming speed by the second operation member 24. That is, the control of invalidating the operation of the second operation member 24 is performed (S16). In a case where the first operation member 23 is not pressed (N in S14), the lens control unit 31 does not perform the angle-of-view zooming of the imaging optical system 22.

In a case where the operation of pressing the first operation member 23 is ended (Y in S17), the lens control unit stops the movement of the zoom lens 22*b* to end the angle-of-view zooming of the imaging optical system 22 (S18). In a case where the operation of pressing the first operation member 23 is continued (N in S17), the lens control unit 31 continues the control of adjusting the angle-of-view zooming speed of the imaging optical system 22 according to the setting pattern selected by the user (S15).

Figure 11:
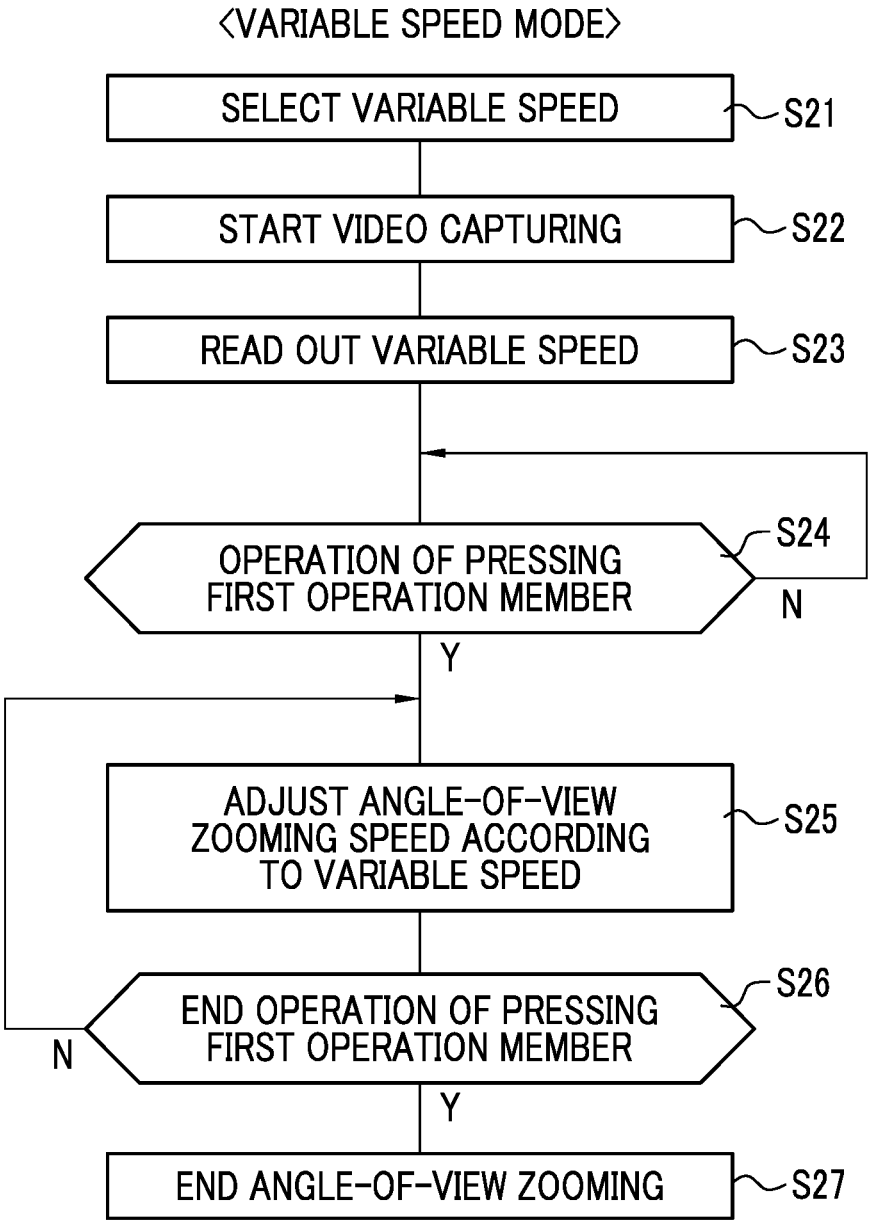
FIG. 11 is a flowchart describing an operation of the digital camera in the variable speed mode.

As shown in FIG. 11, in a case where the variable speed mode is selected, an operation of selecting any one of the variable speeds (control of accelerating or decelerating the angle-of-view zooming speed) by the user is performed (S21). In a case where the operation of selecting the video capturing as the imaging mode is performed to start the video capturing (S22), the lens control unit 31 reads out a variable speed selected by the user (S23).

In a case where the first operation member 23 is pressed (Y in S24), the lens control unit 31 performs the control of accelerating or decelerating the angle-of-view zooming speed of the imaging optical system 22 according to the variable speed selected by the user. (S25). In a case where the first operation member 23 is not pressed (N in S24), the lens control unit 31 does not perform the angle-of-view zooming of the imaging optical system 22. Further, in a case where the angle-of-view zooming of the imaging optical system 22 is performed, the lens control unit 31 may receive the instruction to change the variable speed by the second operation member 24. In this case, the lens control unit 31 performs the control of accelerating or decelerating the angle-of-view zooming speed of the imaging optical system 22 according to the variable speed after the change.

In a case where the operation of pressing the first operation member 23 is ended (Y in S26), the lens control unit stops the movement of the zoom lens 22*b* and ends the angle-of-view zooming of the imaging optical system 22 (S18). In a case where the operation of pressing the first operation member 23 is continued (N in S17), the lens control unit 31 continues the control of adjusting the angle-of-view zooming speed of the imaging optical system 22 according to the setting pattern selected by the user (S25).

As shown in FIG. 12, in a case where the constant speed mode is selected, the operation of selecting the video capturing as the imaging mode is performed to start the video capturing (S31). In a case where the first operation member 23 is pressed (Y in S32), the lens control unit 31 performs the control of holding the angle-of-view zooming speed constant regardless of the pressing time (S33). In a case where the first operation member 23 is not pressed (N in S32), the lens control unit 31 does not perform the angle-of-view zooming of the imaging optical system 22. Further, in a case where the angle-of-view zooming of the imaging optical system 22 is performed, the lens control unit 31 may receive the instruction to change the angle-of-view zooming speed by the second operation member 24. In this case, the lens control unit 31 performs the control of holding the angle-of-view zooming speed constant regardless of the pressing time according to the angle-of-view zooming speed after the change.

In a case where the operation of pressing the first operation member 23 is ended (Y in S34), the lens control unit stops the movement of the zoom lens 22*b* to end angle-of-view zooming of the imaging optical system 22 (S35). In a case where the operation of pressing the first operation member 23 is continued (N in S34), the lens control unit 31 continues the control of holding the angle-of-view zooming speed constant regardless of the pressing time (S35).

As described above, with the change of the degree of adjustment (variable speed, speed, or the like) of the angle-of-view zooming using the second operation member 24 in the case of video capturing, the user can easily change the angle-of-view zooming speed to a random speed.

Further, the second operation member 24 is provided near the first operation member 23. Accordingly, the user can switch the operation target between the first operation member 23 and the second operation member 24 by slightly moving the finger of the left hand. That is, it is possible to further easily perform the operation of adjusting the angle-of-view zooming speed. Further, since the second operation member 24 is disposed with respect to the first operation member 23 in the optical axis direction OA of the lens barrel main body 21, it is possible to further easily perform the operation of adjusting the angle-of-view zooming speed. Further, with the fact that the second operation member 24 is positioned on the camera body 11 side of the lens barrel main body 21 in the optical axis direction OA with respect to the first operation member 23 and disposed at the position overlapping with the first operation member 23 in the circumferential direction R of the lens barrel main body 21, it is also effective in improving operability in a case where the angle-of-view zooming speed is adjusted.

Further, in the program mode, the lens control unit 31 performs the control of not receiving the instruction to adjust the angle-of-view zooming speed by the second operation member 24 in a case where the angle-of-view zooming of the imaging optical system 22 is performed. Therefore, even in a case where the second operation member 24 is unintentionally moved by the user, it is possible to continue the control of adjusting the angle-of-view zooming speed of the imaging optical system 22 according to the setting pattern selected by the user without changing the setting pattern.

Further, the restriction mechanism that puts the rotation of the second operation member 24 in the restriction state is provided. Therefore, in a case where the degree of adjustment is changed to a degree of adjustment (angle-of-view zooming speed or acceleration) desired by the user and then the user does not desire to change the degree of adjustment thereafter, the lock knob 28 may be operated to put the rotation of the second operation member in the restriction state. Accordingly, even in a case where the user unintentionally touches the second operation member 24, the degree of adjustment is not changed.

Further, the first to third operation members 23 to 25 are disposed in the operation member area 29 at one location. Therefore, it is possible to reduce a mounting space for the operation members and achieve miniaturization and light weight of the entire lens barrel 12. Accordingly, there is an advantage that the burden on the user in gripping the lens barrel 12 is small and the user is less likely to get tired even in long-time capturing. Further, in the present embodiment, since the first to third operation members 23 to 25 are operation switches such as the seesaw switch instead of a rotation operation ring, a waterproof structure can be easily formed.

Second Embodiment

Figure 13:
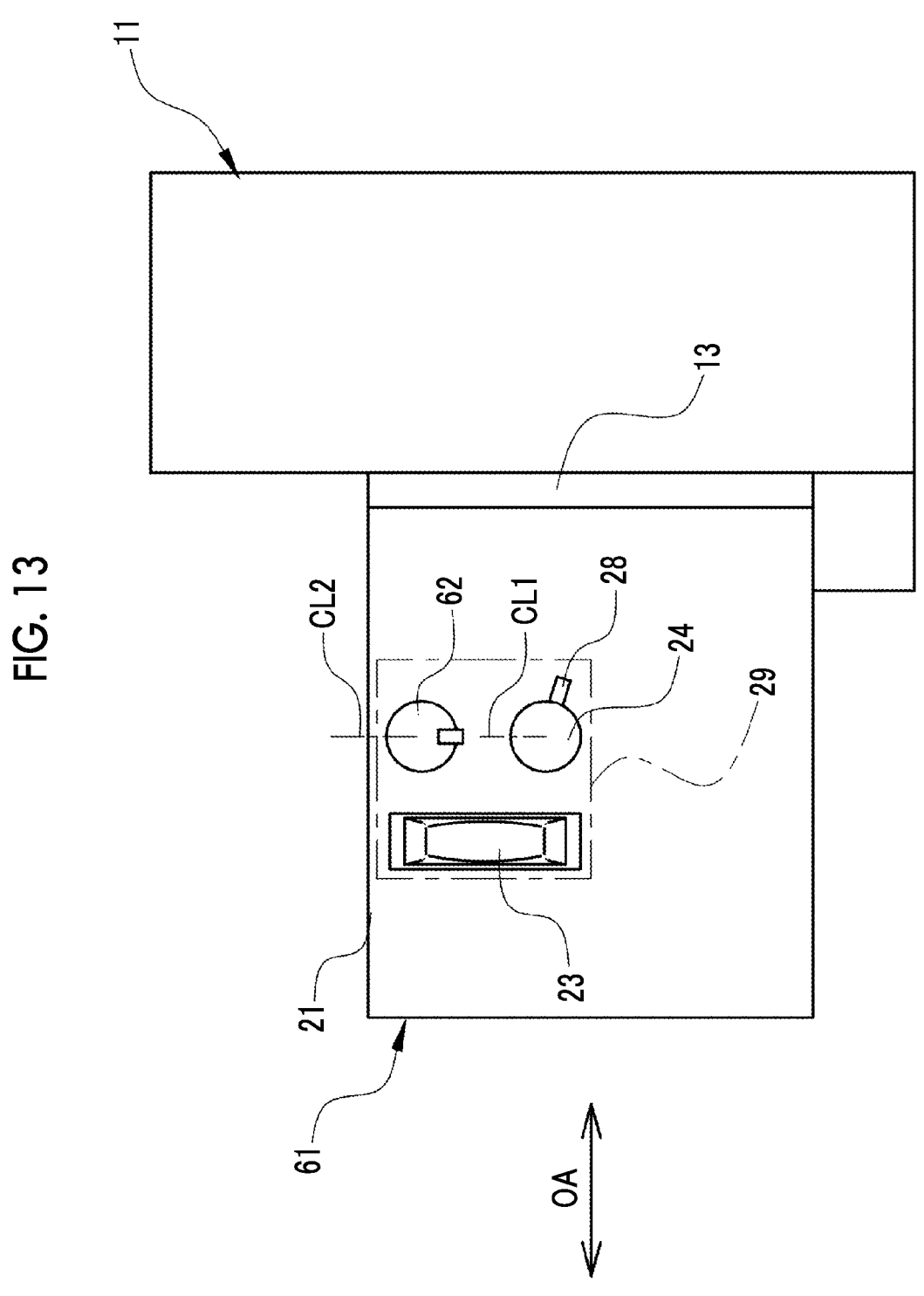
FIG. 13 is a side view of the digital camera according to a second embodiment.

In the first embodiment described above, an example is described in which the slide switch is applied as the third operation member 25, but the present invention is not limited thereto. A third operation member 62 may be the rotation member as in a lens barrel 61 shown in FIG. 13. The configurations other than the third operation member 62 are the same as those of the lens barrel 12 of the first embodiment, and the same reference numerals are assigned to the same parts and the description thereof will be omitted.

The third operation member 62 is provided around the lens barrel main body 21, and specifically, is provided on the outer peripheral surface of the lens barrel main body 21. The third operation member 62 is disposed within the range of the operation member area 29 described above. The third operation member 62 is positioned on the camera body 11 side in the optical axis direction OA with respect to the first operation member 23 and disposed at the position overlapping with the second operation member 24 in the optical axis direction OA.

The third operation member 62 is a second rotation member that is rotatably supported about a rotational axis CL2 intersecting the optical axis direction OA of the lens barrel main body 21. The rotational axis CL2 is preferably orthogonal to the optical axis direction OA. The third operation member 62 is a mode selector switch that switches the mode to any one of the program mode, the second mode, and the third mode.

The first to third operation members 23, 24, and 62 are disposed in the operation member area 29 at one location as in the first embodiment. Therefore, it is possible to reduce a mounting space for the operation members and achieve miniaturization and light weight of the entire lens barrel 61. Accordingly, it is possible to obtain the same effect as that of the first embodiment. Further, since the first to third operation members 23, 24, and 62 are operation switches such as the seesaw switch instead of a rotation operation ring as in the first embodiment, a waterproof structure can be easily formed.

Third Embodiment

Figure 14:
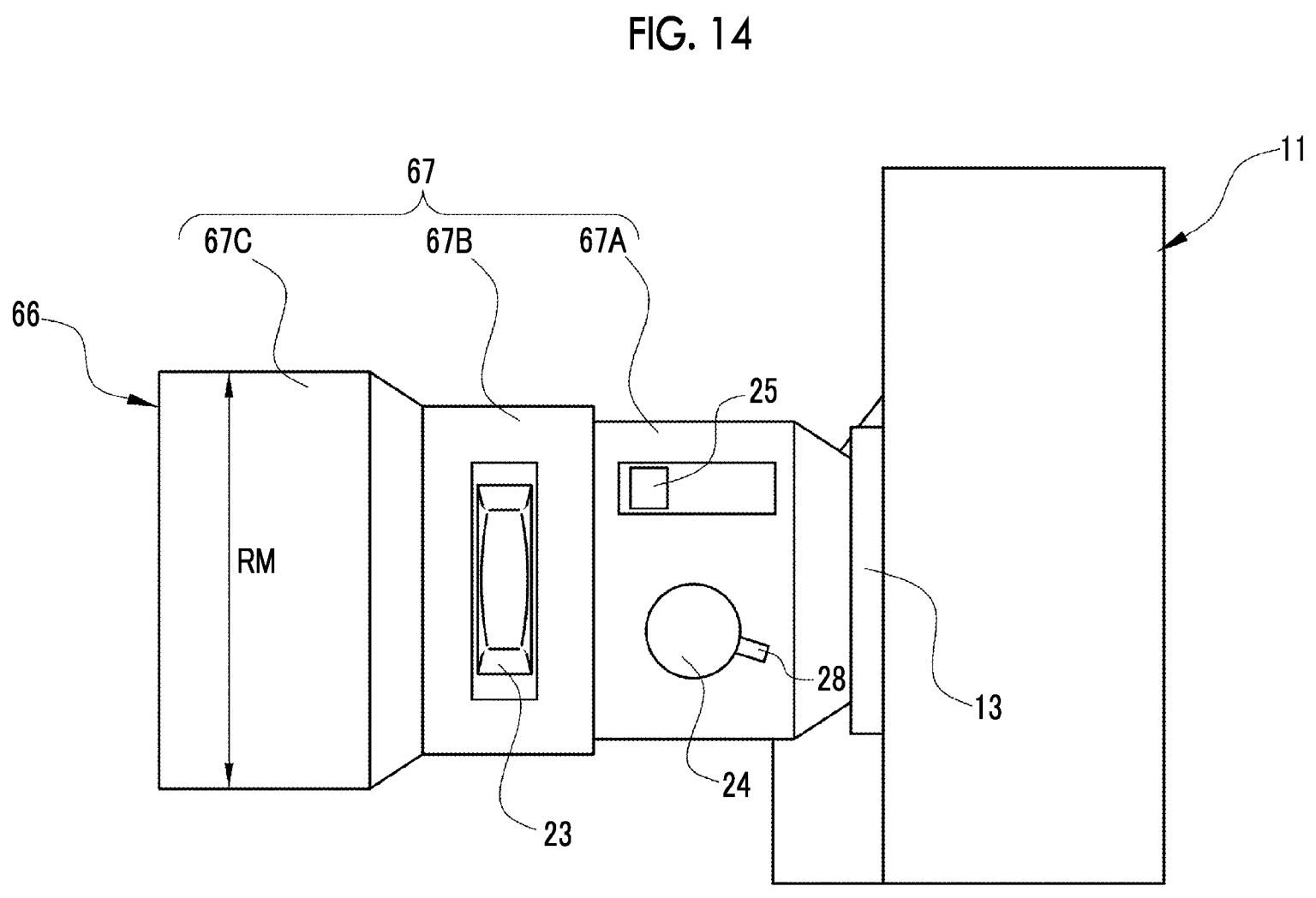

In the first and second embodiments, the lens barrel main body 21 has a cylindrical shape having a substantially constant outer diameter, but the present invention is not limited thereto. As shown in FIG. 14, the present invention may be applied to a lens barrel 66 composed of a lens barrel main body 67, which has a cylindrical shape having a stepped part. The same reference numerals are assigned to the same parts as those in the first and second embodiments, and the description thereof will be omitted.

The lens barrel main body 67 is composed of a small diameter part 67A, a medium diameter part 67B, and a large diameter part 67C whose outer diameters gradually increase from the camera body 11 side toward the subject side. An outer diameter RM of the large diameter part 67C is, that is, a maximum outer diameter of the lens barrel main body 67. In the present embodiment, the first operation member 23 is disposed in the medium diameter part 67B, and the second and third operation members 24 and 25 are disposed in the small diameter part 67A. In addition, in the present embodiment, it is preferable to dispose the first to third operation members 23 to 25 in the operation member area 29 described in the first embodiment.

Figure 15:
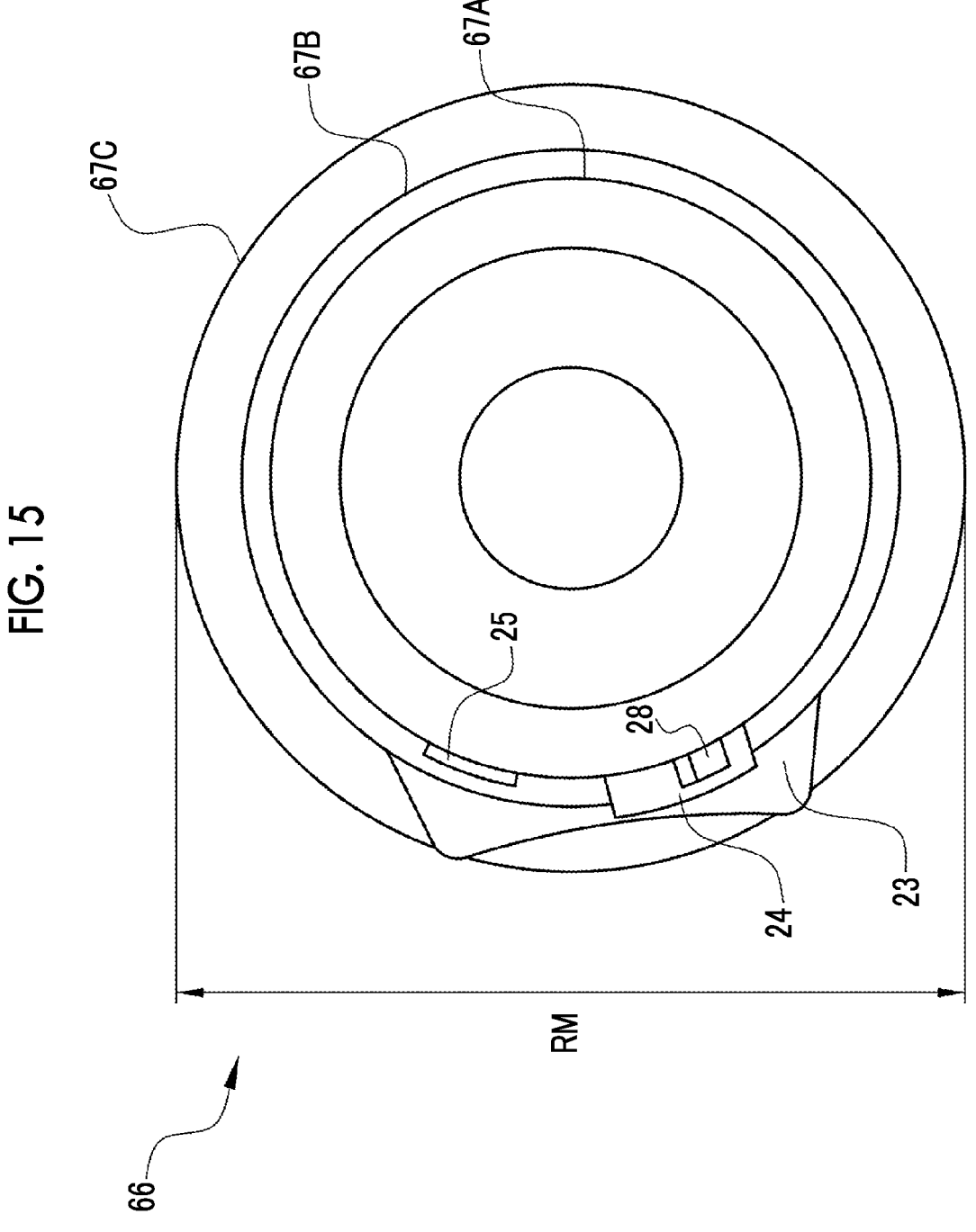
FIG. 15 is a rear view of the lens barrel according to the third embodiment.

As shown in FIG. 15, a position of the second operation member 24 in a radial direction of the lens barrel main body 67 is positioned on an inner diameter side of the outer diameter RM, which is the maximum outer diameter of the lens barrel main body 67. Accordingly, it is possible to improve the operability of the second operation member 24 and achieve the miniaturization of the entire lens barrel 66.

Fourth Embodiment

In the first to third embodiments described above, the first to third operation members are provided in the lens barrel main body, but the present invention is not limited thereto. As in the lens barrel 71 shown in FIG. 16, an operation module 73 including the first and second operation members 23 and 24 may be provided for a lens barrel main body 72 attachably and detachably. The same reference numerals are assigned to the same parts as those in the first and second embodiments, and the description thereof will be omitted.

The operation module 73 constitutes, for example, a part of an outer peripheral surface of the lens barrel main body 72. The lens barrel main body 72 has a recessed portion 72A on the outer peripheral surface thereof. The operation module 73 and the lens barrel main body 72 are each provided with an attraction member such as a magnetic material. With fitting into the recessed portion 72A and attraction of the attraction member, the operation module 73 is attached to the lens barrel main body 72 attachably and detachably. It is preferable that the operation module 73 communicates with the lens control unit 31 via radio or the like to transmit signals by the operation of the first and second operation members 23 and 24.

Figure 16:
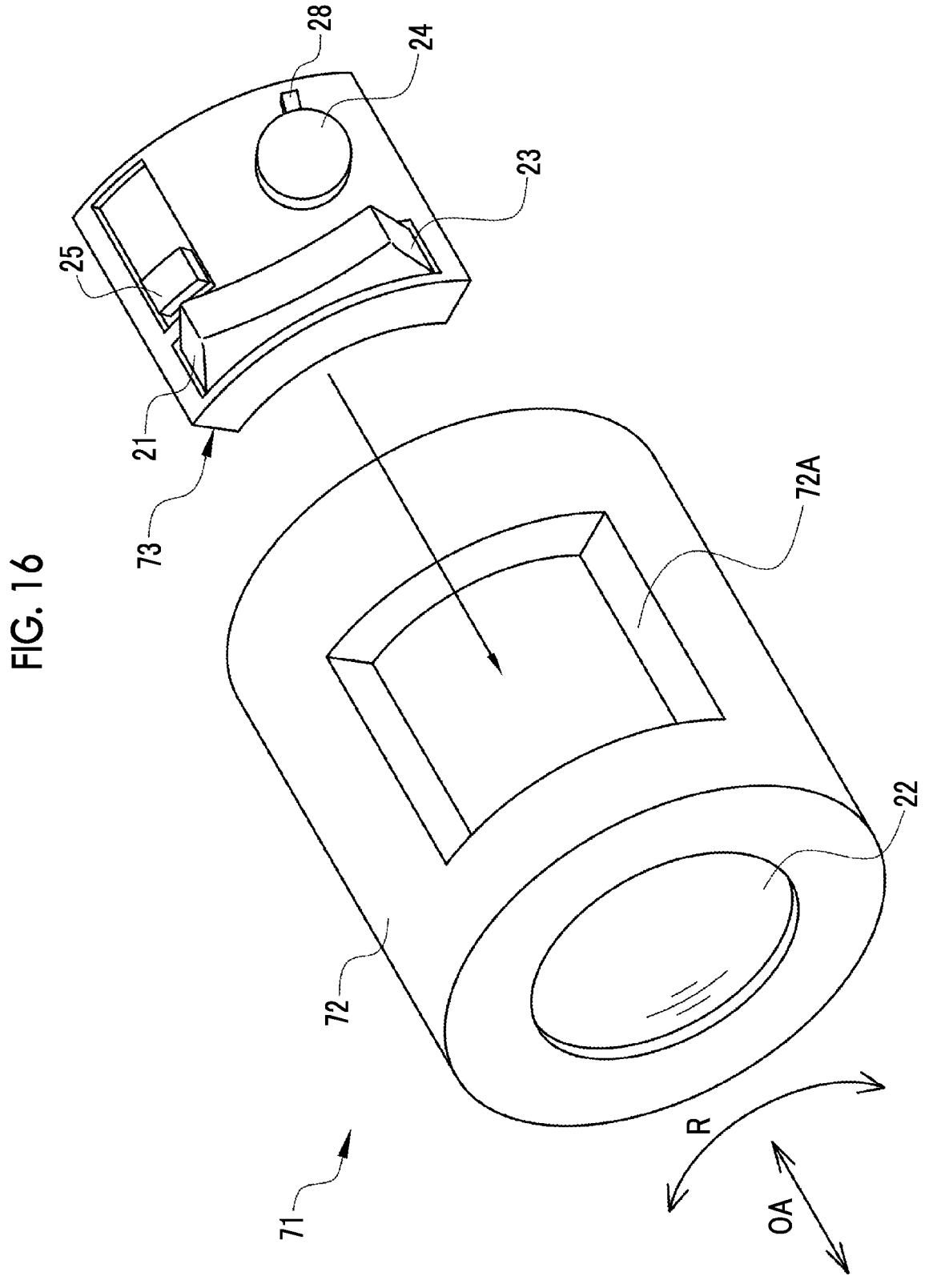
FIG. 16 is a side view of the digital camera according to a fourth embodiment.

In FIG. 16, the operation module 73 includes all of the first to third operation members 23 to 25, but the present invention is not limited thereto. The operation module 73 may include at least the first and second operation members 23 and 24. Further, it is preferable that the operation module 73 is attached in the operation member area 29 described in the first embodiment.

In each of the above embodiments, the angle-of-view zooming of the imaging optical system 22 is exemplified as the optical function of performing the adjustment by the first to third operation members in the case of video capturing, but the present invention is not limited thereto. Any optical function that can perform the adjustment in the lens barrel may be used, for example, any one of a stop and a camera shake correction amount of the imaging optical system 22 may be used. In a case where the stop of the imaging optical system 22 is adjusted by the first to third operation members in the case of video capturing, it is preferable that the stop leaf blades are moved to a maximum stop side or a minimum stop side according to the operation amount of the first operation member, and it is preferable that one of the first to third modes is selected by the third operation member, as in each of the above embodiments, and a degree of adjustment (movement speed or acceleration) of the stop leaf blades is changed by the second operation member.

Further, in a case where the camera shake correction amount of the imaging optical system 22 is adjusted by the first to third operation members in the case of video capturing, it is preferable that the movement of the camera shake correction lens is adjusted according to the operation amount of the first operation member, and it is preferable that one of the first to third modes is selected by the third operation member, as in each of the above embodiments, and a degree of adjustment (movement speed or acceleration) of the camera shake correction lens is changed by the second operation member.

Further, in each of the above embodiments, the seesaw switch is mainly used as the first operation member and the slide switch is mainly used as the second operation member, but the present invention is not limited thereto. Any operation member that allows an input according to the operation amount may be used as the first operation member, such as the slide switch, a push button, a slide lever, a galvanic lever, a galvanic switch, a swinging material provided swingably with respect to the lens barrel main body, and a movable material provided slidably or rotatably with respect to the lens barrel main body. Further, in a case where the first operation member is the push button, it is preferable that two push buttons are provided for one lens barrel main body. On the other hand, any operation member that allows an input by rotation may be used as the second operation member, such as an operation dial, a volume, a jog dial, a galvanic dial, a swing dial, a knob, an adjustment knob, a rotary protrusion, a command dial, and a rotor.

In each of the above embodiments, a hardware structure of the processing unit that executes various processing, such as the lens control unit 31 and the camera body control unit 41, is various processors as shown below. The various processors include a central processing unit (CPU) and a graphical processing unit (GPU), which are general-purpose processors that execute software (program) to function as various processing units, a programmable logic device (PLD), which is a processor whose circuit configuration can be changed after manufacturing, such as a field programmable gate array (FPGA), a dedicated electric circuit, which is a processor having a circuit configuration specially designed to execute various pieces of processing, and the like.

One processing unit may be configured by one of the various processors or a combination of two or more processors of the same type or different types (for example, a plurality of FPGAs, a combination of CPU and FPGA, or a combination of CPU and GPU). The plurality of processing units may be composed of one processor. As an example in which the plurality of processing units are configured by one processor, firstly, as represented by a computer such as a client and a server, there is a form in which one processor is configured by a combination of one or more CPUs and software and the processor functions as the plurality of processing units. Second, as represented by a system-on-chip (SoC) or the like, there is a form in which a processor that realizes the functions of the entire system including the plurality of processing units with one integrated circuit (IC) chip is used. As described above, the various processing units are configured by using one or more various processors as the hardware structure.

Further, the hardware structure of the various processors, more specifically, is an electric circuit (circuitry) in which circuit elements such as semiconductor elements are combined.

The present invention can be applied to imaging devices such as a smartphone and a video camera in addition to the digital camera.

EXPLANATION OF REFERENCES

10: digital camera
11: camera body
12: lens barrel
13: lens mount
14: release switch
16: imaging element
17: body-side signal contact
21: lens barrel main body
22: imaging optical system
22a: focus lens
22b: zoom lens 22c: camera shake correction lens
23: first operation member
24: second operation member
25: third operation member
26: lens mount
27: lens-side signal contact
28: lock knob
29: operation member area
31: lens control unit
32: motor driver
33: camera shake detection sensor
34 to 37: motor
38: stop unit
38a: stop leaf blade
41: camera body control unit
42: shutter unit
43: motor driver
44: image memory
45: bus line
46: image data processing unit
47: LCD driver
48: image display unit
49: interface (I/F)
51: memory card
52: automatic exposure (AE) processing unit
53: shutter motor
61: lens barrel
62: third operation member
66: lens barrel
67: lens barrel main body
67A: small diameter part
67B: medium diameter part
67C: large diameter part
71: lens barrel
72: lens barrel main body
72A: recessed portion
73: operation module
CL1: rotational axis
CL2: rotational axis
E1: range
E2: range
OA: optical axis direction
P0: reference position
R: circumferential direction
RM: outer diameter
S: angle-of-view zooming speed
TP: pressing time
T0: pressing start time

What is claimed is:

1. A lens barrel comprising:
a lens barrel main body that holds an optical system;
a first operation member that is provided around the lens
 barrel main body and adjusts an optical function of the
 optical system;
a second operation member that is provided around the
 lens barrel main body and varies a degree of adjustment
 of the optical function by the first operation member;
 and
a processor configured to perform, in a case where the first
 operation member is operated, control of executing a
 first mode in which the optical function is adjusted
 according to a setting pattern, and
wherein, in the setting pattern, an amount of increase in an
 adjustment speed is large at a rising edge of the
 operation, and the amount of increase in the adjustment
 speed is gradually small as a pressing time elapses, wherein the lens barrel further comprising:
 a third operation member that is provided around the
  lens barrel main body,
 wherein the processor is configured to perform control
  of switching a mode to any one of the first mode, a
  second mode, or a third mode by operating the third
  operation member, wherein the adjustment speed in
  adjusting the optical function according to an opera-
  tion amount of the first operation member is different
  depending on the mode.

2. The lens barrel according to claim 1,
wherein the second operation member is provided near
 the first operation member.

3. The lens barrel according to claim 1,
wherein the second operation member is disposed with
 respect to the first operation member in an optical axis
 direction of the lens barrel main body.

4. The lens barrel according to claim 3,
wherein the lens barrel main body is detachable from and
 attachable to a camera main body, and
the second operation member is positioned on a camera
 main body side of the lens barrel main body in the
 optical axis direction with respect to the first operation
 member and is disposed at a position overlapping with
 the first operation member in a circumferential direc-
 tion of the lens barrel main body.

5. The lens barrel according to claim 4,
wherein the lens barrel main body has an operation
 member area including the first and second operation
 members, and
in a case where an upper position around the lens barrel
 main body in a vertical direction is a reference position,
 the camera main body side of the lens barrel main body
 in the optical axis direction is a rear surface side, and
 a subject side opposite to the camera main body side is
 a front surface side, the operation member area is
 provided on a left-side surface side around the lens
 barrel main body with the reference position as a base
 point.

6. The lens barrel according to claim 5,
wherein the operation member area is disposed within a
 range of 0° to 90° with the reference position as the
 base point.

7. The lens barrel according to claim 1,
wherein the second operation member is a first rotation
 member rotatably supported about a rotational axis
 intersecting an optical axis direction of the lens barrel
 main body.

8. The lens barrel according to claim 7, further compris-
ing:
 a restriction mechanism that is provided in the second
  operation member and puts rotation of the second
  operation member in a restriction state where the
  rotation is restricted.

9. The lens barrel according to claim 8,
wherein the restriction mechanism switches between the
 restriction state and a release state where the restriction
 state is released.

10. The lens barrel according to claim 1,
wherein a position of the second operation member in a
 radial direction of the lens barrel main body is posi-
 tioned on an inner diameter side of a maximum outer
 diameter of the lens barrel main body.

11. The lens barrel according to claim 1,
wherein the processor is configured to store in advance
 the setting pattern indicating a relationship between the operation amount of the first operation member and an adjustment amount of the optical function according to the operation amount.

12. The lens barrel according to claim 11, wherein the processor is configured to perform control of executing the second mode in which the adjustment speed in the case of adjusting the optical function is accelerated or decelerated according to the operation amount.

13. The lens barrel according to claim 12, wherein the processor is configured to perform control of executing the third mode in which the adjustment speed in the case of adjusting the optical function is held constant regardless of the operation amount.

14. The lens barrel according to claim 11, wherein the optical function to be adjusted according to the operation amount of the first operation member is any one of an angle of view, a stop, or a camera shake correction amount of the optical system.

15. The lens barrel according to claim 1, wherein the processor is configured to perform, in the first mode, control of not receiving an instruction to adjust the optical function by the second operation member.

16. The lens barrel according to claim 1, wherein the processor is configured to perform, in the second mode, control of accelerating or decelerating the adjustment speed by operating the second operation member.

17. The lens barrel according to claim 1, wherein the processor is configured to perform, in the third mode, control of selecting any one of a plurality of the adjustment speeds by operating the second operation member.

18. An imaging device comprising:
the lens barrel according to claim 1; and
a camera main body.

19. A lens barrel comprising:
a lens barrel main body that holds an optical system;
a first operation member that is provided around the lens barrel main body and adjusts an optical function of the optical system;
a second operation member that is provided around the lens barrel main body and varies a degree of adjustment of the optical function by the first operation member; and
a processor configured to perform, in a case where the first operation member is operated, control of executing a first mode in which the optical function is adjusted according to a setting pattern, and
wherein, in the setting pattern, an amount of increase in an adjustment speed is large at a rising edge of the operation, and the amount of increase in the adjustment speed is gradually small as a pressing time elapses, wherein the second operation member is a first rotation member rotatably supported about a rotational axis intersecting an optical axis direction of the lens barrel main body.

20. A lens barrel comprising:
a lens barrel main body that holds an optical system;
a first operation member that is provided around the lens barrel main body and adjusts an optical function of the optical system;
a second operation member that is provided around the lens barrel main body and varies a degree of adjustment of the optical function by the first operation member; and
a processor configured to perform, in a case where the first operation member is operated, control of executing a first mode in which the optical function is adjusted according to a setting pattern, and
wherein, in the setting pattern, an amount of increase in an adjustment speed is large at a rising edge of the operation, and the amount of increase in the adjustment speed is gradually small as a pressing time elapses,
wherein the lens barrel main body is detachable from and attachable to a camera main body, and
the second operation member is positioned on a camera main body side of the lens barrel main body in an optical axis direction with respect to the first operation member and is disposed at a position overlapping with the first operation member in a circumferential direction of the lens barrel main body.

21. A lens barrel comprising:
a lens barrel main body that holds an optical system;
a first operation member that is provided around the lens barrel main body and adjusts an optical function of the optical system;
a second operation member that is provided around the lens barrel main body and varies a degree of adjustment of the optical function by the first operation member; and
a processor configured to perform, in a case where the first operation member is operated, control of executing a first mode in which the optical function is adjusted according to a setting pattern, and
wherein, in the setting pattern, an amount of increase in an adjustment speed is large at a rising edge of the operation, and the amount of increase in the adjustment speed is gradually small as a pressing time elapses,
wherein a position of the second operation member in a radial direction of the lens barrel main body is positioned on an inner diameter side of a maximum outer diameter of the lens barrel main body.

* * * * *